United States Patent [19]

Robbins et al.

[11] Patent Number: 4,782,430

[45] Date of Patent: Nov. 1, 1988

[54] LIGHT CONDUIT ILLUMINATION SYSTEM FOR UNDERWATER LIGHTING

[75] Inventors: John A. Robbins, Canoga Park; Paul E. Robbins, Granada Hills, both of Calif.

[73] Assignee: Lumenyte Corporation, Chatsworth, Calif.

[21] Appl. No.: 888,830

[22] Filed: Jul. 22, 1986

[51] Int. Cl.[4] .............................................. F21V 7/04
[52] U.S. Cl. ..................................... 362/32; 362/267; 362/147; 285/158; 285/192
[58] Field of Search ................. 362/32, 145, 267, 147; 285/161, 158, 192

[56] References Cited

U.S. PATENT DOCUMENTS

| 1,755,104 | 4/1930 | Deierlein | 285/158 |
| 3,337,725 | 8/1967 | Nash | 362/267 |
| 3,441,957 | 4/1969 | Friedman | 362/32 |
| 3,813,514 | 5/1974 | Canty | 362/32 |

FOREIGN PATENT DOCUMENTS 2125178  9/1972  France ................................. 362/32

Primary Examiner—James C. Yeung
Attorney, Agent, or Firm—Thomas I. Rozsa

[57] ABSTRACT

A waterproof coupling for use in conjunction with illumination systems for swimming pools, spas, and the like, employs a light conduit placed within the waterproof fitting to provide safe light for underwater use by keeping any source of electricity remote from the water. Some embodiments may be removed from the pool. Others are permanent.

9 Claims, 2 Drawing Sheets

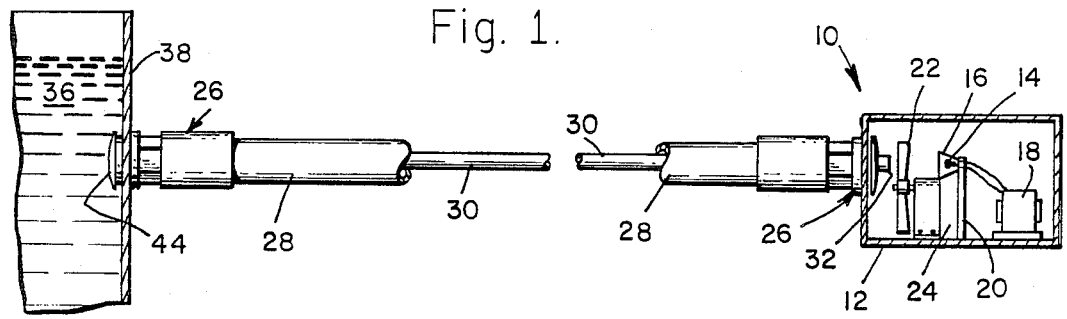
Fig. 1.
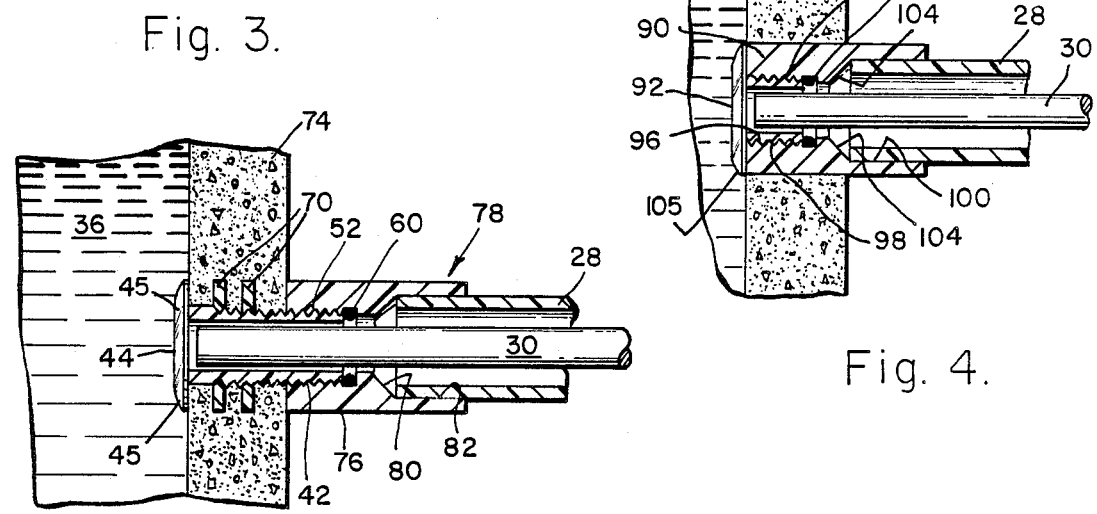
Fig. 3.
Fig. 4.
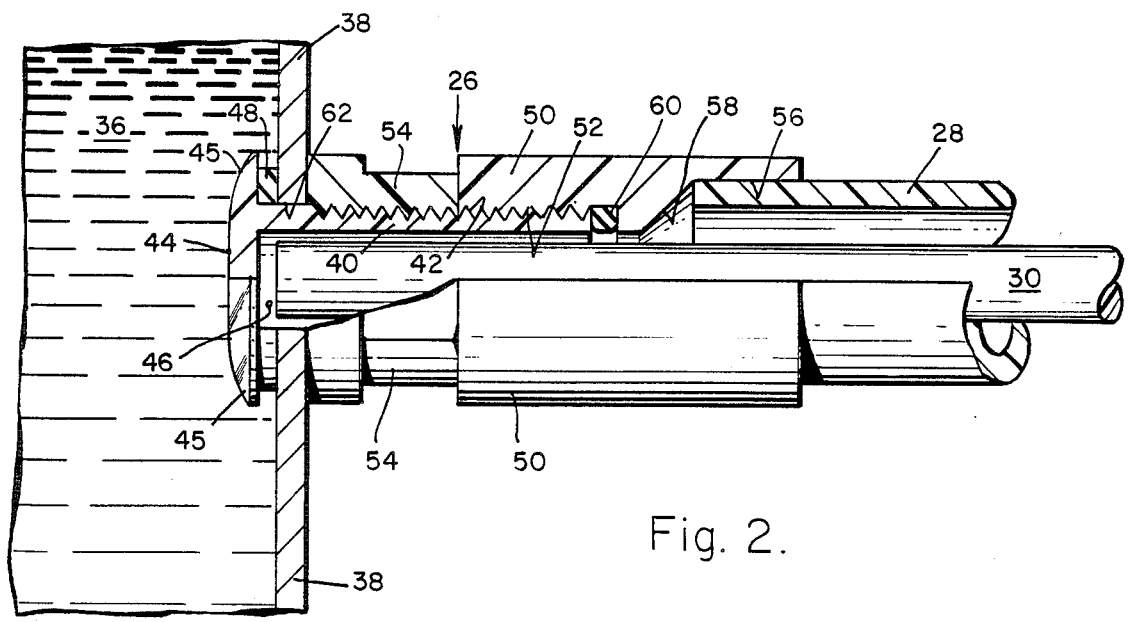
Fig. 2.

LIGHT CONDUIT ILLUMINATION SYSTEM FOR UNDERWATER LIGHTING

BACKGROUND OF THE INVENTION

1. Field of the Invention.

The present invention relates to an underwater illumination system. More particularly, the present invention relates to a waterproof fitting for a light conduit illumination system, for providing safe light in swimming pools, spas, and other applications where electricity creates dangers due to the presence of water.

2. The Prior Art

In underwater applications, such as illuminating swimming pools, typically a recess is formed in the side wall of a swimming pool below the water line. A small diameter tunnel, large enough to accommodate a conduit, which carries power lines, is formed from the recess to a point about one foot above the surface of the ground. An incandescent lamp seated in a housing is placed within the recess, and the conduit is inserted through the tunnel and fixed to the housing. Electrical power lines run from a source of power through the conduit and to the lamp. A collar may be placed over the face of the lamp housing inside the pool, to present a pleasant appearance.

The apparatus is not waterproof. Rather, water surrounds the housing that holds lamp, enters the conduit, and surrounds the power lines within the conduit. Naturally, the water reaches the same level within the tunnel as it reaches within the pool or spa. Thus, the housing, conduit, and power line is continually bathed in water. Because the lamp is confined within a small recess, it would overheat and burn out prematurely if the lamp housing were not continuously bathed in water. The water circulates because convection causes the heated water within the recess to be is laced by cooler water.

Even if the housing and conduit were waterproof, it must be expected that water will enter the conduit tunnel and settle in low spots in the tunnel. Rain water and water used to wash the area around the pool often falls on the ground level access side of the lighting system and flows into the tunnel.

Burrs form whenever metal conduit is cut. Building codes require that cut and formed conduit be de-burred prior to installation of electrical wiring, but this requirement is often ignored. When the electrical power line is pulled through the conduit during installation of the system, the insulation may be abraded or stripped, leading either to premature failure of the insulation, or a source of leakage current from the time of installation.

In addition, continual exposure to water and the chemicals in the water deteriorates the insulation, regardless of the type of insulation employed. In time, the electric power line swells and looses some of its ability to insulate, so that electricity leaks from the power line. In addition rain water often finds its way into the conduit, so that the conduit is wet even above the pool water line. The electricity naturaily follows the path of least resistance to a complete circuit, which may be in the power line or in the pool itself, depending on circumstances such as the amount of electrolytes in the water (that is, salts), temperature, and condition of the brass conduit.

Of course the circuits for such lamps are protected by circuit breakers in the breaker box, and by a ground fault interrupters. In electrically conducting water, such as that found in a swimming pool, however, very little electricity is required to electrocute a person. A current of only about 9 milliamps that passes through a vital portion of a person's body, such as the heart, is required to electrocute a person. According to Underwriters Laboratories, when a person is immersed in conducting water, as little as 15 volts can produce a lethal current of 9 milliamps in a man and a lethal current of 15 milliamps in a woman. Children are even more susceptible to low voltage leakage in swimming pool water.

Building codes universally require that all metal components of a pool or spa, such as the ladders found on the sides of many pools, be grounded, providing a natural path through the water for any electrical current. If a leakage current exists, and a person grasps such a ground, he may be exposed to a danger of electrocution.

Circuit breakers commonly employed in the circuits of swimming pool lights are triggered by much greater current. Thus a swimming pool light circuit may easily leak a lethal current without triggering the circuit breaker. In an effort to overcome this difficulty, ground fault interrupters have been employed. They are set to disconnect the electricity when non-lethal electrical leakage occurs. Such leakage occurs frequently, and may occur intermittently, causing the ground fault interrupter to turn the circuit off frequently. This is an unacceptable nuisance for most pool operators. Many pool operators disconnect the ground fault interrupters.

Consequently, a number of people are electrocuted every year by swimming pool lights. Efforts to eliminate this hazard have not been successful.

To reduce the danger from swimming pool lights, it is customary to install periodically new power lines. This requires draining the pool to a level below the lamp housings. Removing the old power lines from the conduit is often extremely difficult, because typical insulation used in this application swells dramatically when exposed to water, and then fits tightly in the conduit, from which it must be pulled. Changing the lamp, which also requires partially draining the pool, or the power lines is a very involved labor-intensive and expensive job.

Therefore, a need exists for an illumination system for use in a water environment, such as a swimming pool or spa, which eliminates the danger of electrocution, simplifies maintenance and reduces maintenance.

SUMMARY OF THE INVENTION

The present invention provides a waterproof, nonelectric illumination system for wet environments, such as swimming pools and spas. The present invention employes a fiber optic, or light conduit, for transmitting light into a pool or spa from a remotely located electric lamp. A waterproof fitting is inserted through a wall of the pool, and the light conduit is inserted into the fitting, through the conduit. Using this system, the source of light, and the only electrical part of the apparatus, may be placed remotely from the water at any convenient distance, which often is ten to twenty feet or more. Different embodiments of the fitting have specialized applications for different types of pools and spas.

Accordingly, it is an object of the present invention to provide an apparatus and method for illuminating a pool, a spa, or other water environment, and eliminating the risk of electrocution.

It is another object of the present invention to provide a lighting system for a pool, spa, or other water environment that is easily serviced and maintained.

An additional object of the present invention is to provide a system that is adaptable to many types of pools, or spas, and that may be installed as a replacement for conventional electric lamps with a minimum of inconvenience and expense.

Further novel features and other objects of the present invention will become apparent from the following detailed description, discussion, and the appended claims, taken in conjunction with the drawings.

BRIEF DESCRIPTION OF THE DRAWINGS

Referring particularly to the drawings for the purposes of illustration only, and not limitation, there is illustrated:

FIG. 1 is a plan view, partially in section, of an illumination system according to the present invention.

FIG. 2 is a fragmentary side elevation, partially in section, of a waterproof fitting according to the present invention.

FIG. 3 is a fragmentary sectional side elevation of another embodiment of the waterproof fitting, according to the present invention.

FIG. 4 is a fragmentary sectional side elevation of another embodiment of the waterproof fitting according to the present invention.

DETAILED DESCRIPTION OF THE PREFERRED EMBODIMENTS

Figures 5, 6:
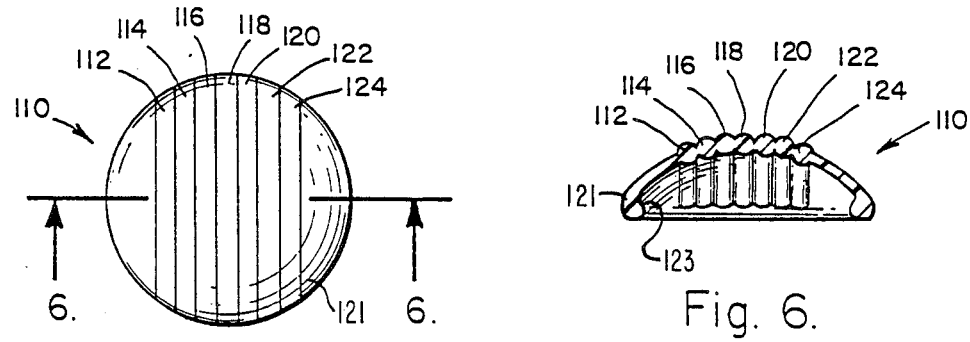
FIG. 5 is a front elevation of a lens cap according to the present invention.
FIG. 6 is a section taken along lines 6—6 of FIG. 5.

Referring to FIG. 1, there is shown light conduit illumination system 10, comprising housing 12, lamp 14, mounted within reflector 16, and attached to lamp mounting bracket 20, an electrical power supply, such as transformer 18, fan 22, driven by fan motor 24, and waterproof fitting 26. Components of light conduit illumination system 10 may be substantially conventional. In operation, transformer 18 provides power, typically 17 volts, to lamp 14, whose light output is focused by reflector 16, and falls on light receiving end 32 of light conduit 30, which may advantageously be placed near the focal point of reflector 16, to be transmitted through light conduit 30, and lens 44, into water 36, of a pool or spa, having a side wall 38, for illuminating the pool under water. Naturally such light may be installed in any convenient wall, including the bottom wall. Fan 22 and fan motor 24 cool light receiving end 32 of light conduit 30, thereby extending the useful life of light conduit 30. Fan 22 is not necessary to the operation of the present invention and may be omitted. Alternative power supplies may be used. Housing 12 may be manufactured from metal, plastic, or other material. Lamp 14 and reflector 16 may be chosen to provide sufficient illumination for a particular application. Fan 22 may be of plastic or other convenient material.

FIG. 1 illustrates light conduit 30 in a straight line. Light conduit 30, however, is flexible and so is conduit 28, allowing conduit 28 and light conduit 30 to be arranged in any convenient configuration, which may include one or more curves, as well as the straight line configuration of FIG. 1.

Referring to FIG. 2, waterproof fitting 26 is illustrated in greater detail. Waterproof fitting 26 consists of hollow screw 40, having male threads 42, along its length, lens 44, (in the position of a typical screw head), and hollow cylindrical core 46, for receiving light conduit 30. Transparent gasket 48 is first placed on the shaft of hollow screw 40, to provide a water tight seal between the back side of lens 44 and side wall 38. Then, hollow screw 40 is inserted through a hole in side wall 38 of a swimming pool. Waterproof fitting 26 further consists of elongated nut 50, having female threads 52 for mating engagement with male threads 42, of hollow screw 40, permitting sealing engagement between the back side of lens 44, transparent gasket 48, and side wall 38, thereby providing a waterproof seal. Lens 44 includes circumferential lip 45, which extends beyond the diameter of male threads 42, providing a surface on hollow screw 40 for gasket 48 to seat against, and for attaching lens cap 110 (see FIGS. 5, 6) if desired. Because hollow screw 40 is a unitary element made from non-porous material, it too is naturally waterproof. Elongated nut 50 abuts separate nut 54 having nut flats for allowing use of pliers, wrenches, or other hand tools in tightening the fixture conveniently.

Elongated nut 50 further includes conduit seat 56, consisting of a larger diameter hollow portion for receiving conduit 28 into waterproof fitting 26. Also included in elongated nut 50 is inwardly tapered side wall 58, for directing light conduit 30 into hollow screw 40, so that light conduit 30 can easily be pushed against lens 44. O-ring ring 60 provides a waterproof seal between hollow screw 40 and elongated nut 50, preventing leaking of water into conduit 28 if water finds its way into the tunnel through which conduit 28 is inserted. If water finds its way into hollow screw 40, no damage will result, and there is no electricity. Housing 12 of light conduit illumination system 10 is placed in any convenient location, higher than the water level, such as in the pool equipment house.

To install waterproof fitting 26, transparent gasket 48 is slipped over the end of hollow screw 40, which is inserted through aperture 62 in side wall 38, and elongated nut 50 is screwed onto hollow screw 40 and may be conveniently tightened by using a wrench on the flats of nut 54, adjacent to nut 50. Then O-ring 60 is seated against inwardly tapered side wall 58 in the lower portion of the neck formed by inwardly tapered side wall 58, and conduit 28 is pushed into conduit seat 56 until conduit 28 seats. Finally, light conduit 30 is threaded through conduit 28 from the end of conduit 28 remote from side wall 38, until light conduit 30 abuts the inside portion of lens 44. Alternatively, light conduit 30 may be inserted into conduit 28 before conduit 28 is installed.

A similar or identical waterproof fitting 26 secures light conduit 30 to light conduit illumination system 10 (that is, to the light source), in the same manner just described in reference to the swimming pool fitting.

Light conduit 30 may be any conduit for transmitting light along its length, with light being received at one end and a significant portion of the light being transmitted out the other end, including materials commonly known as fiber optics, which may be a glass fiber, a bundle of glass fibers bound together with epoxy resin, or any of a number of plastic-type, that is, polymer based light conduits, which are well-known to those skilled in the art. When lamp 14 is turned on, light is transmitted by light conduit 30 into water 36, illuminating the pool or spa, without having any electricity near the water.

If the light conduit needs to be replaced, waterproof fitting 26 located at light conduit illumination system 10, is unfastened, and light conduit 30 is simply pulled from conduit 28 and replaced by pushing a new length of light conduit 30 into conduit 28 and re-attaching waterproof fitting 26 at light conduit illumination system 10. It is not necessary to drain any water from the pool or spa. It is not necessary to turn off any electrical apparatus since no electricity is near light conduit 30. Similarly, changing lamp 14 when it burns out is as safe and easy as changing a household light bulb, since it is remote from the water. Hollow screw 40 may be conveniently molded by injection molding or the like from a transparent plastic such as water-clear lexan, commonly designated as 143 lexan, for transmitting light clearly into the water. Naturally, colored lenses may be employed. A color filter may be disposed on light receiving end 32 of light conduit 30, to change the color of the light in a manner well-known to those skilled in the art. Alternatively, a color wheel having a plurality of colored circumferential segments, may be disposed to rotate between lamp 14 and light receiving end 32 of light conduit 30. These arrangements provide great versatility in the color of light shown into the water, enabling the user to achieve pleasing and varied aesthetic effects. The mating element, such as elongated nut 50 or elongated screw 90 (FIG. 4), may also be conveniently formed by injection molding plastic or other method.

Referring to FIG. 3, there is shown waterproof fitting 78 (an alternative embodiment of the waterproof fitting 26 of FIG. 2), in which two washer discs 70 are disposed about hollow screw 40 as illustrated, prior to insertion through an aperture in side wall 74 of a spa or pool, which may be made from gunnite, plaster, or the like. The aperture is then entirely filled with the sealing material thereby permanently sealing hollow screw 40 into side wall 74, and preventing its ordinary removal. In this embodiment a water tight seal is formed along the elongated threaded portion of hollow screw 40, and it is not necessary to employ a gasket between lens 44 and side wall 74. Elongated nut 76 is then screwed onto the shaft of hollow screw 40, providing further rigidity and stability in waterproof fitting 78, and providing inwardly tapered side wall 80 and conduit seat 82 for receiving O-ring 60, conduit 28, and light conduit 30, in the manner described above.

Referring to FIG. 4, there is shown an alternative embodiment of the invention in which elongated nut 90 having threads 94 is secured into side wall 74, which is made of gunnite, plaster, or the like, by filling the aperture through which nut 90 is inserted with like material. Nut 90 is therefore not removable in the ordinary course of maintenance, and is considered a permanent installation. Screw 96 includes threads 98, conduit seat 100, against which O-ring 102 is seated, and inwardly tapered side wall 104, for permitting sealing engagement of O-ring 102, male coupling 96, and conduit 28.

After nut 90 is embedded in side wall 74, elongated screw 96 is screwed into it, with gasket 105 between the back surface of lens 92 and side wall 74 to provide a waterproof seal between the light fitting and the pool wall. The remainder of installation and maintenance is the same as described above. In the embodiment illustrated in FIG. 4, male coupling, or screw 96 can be removed from nut 90, without removing nut 90 from side wall 74.

In practice, light transmitted from a fiber optic through lens 44, or 92, or the like having smooth inner and outer surfaces (like those illustrated in FIGS. 1 through 4) is not scattered very much but is transmitted in a cone shaped beam having a relatively small angle, and having a circular cross-section. It is desirable to scatter light in a pool or spa throughout a greater portion of the water to provide more even lighting. This can be achieved by a lens or lens cap having irregular outer and inner surfaces.

Referring to FIGS. 5 and 6, there is illustrated a preferred embodiment of a lens cap that scatters the light more effectively, which is attached over a standard smooth lens having a circumferential lip, such as lens 44 of FIG. 2. Lens cap 110 is an outwardly convex lens cap having seven parallel cylindrical rods 112, 114, 116, 118, 120, 122, 124 integrally formed in lens cap 110 and conforming to the parallel curvatures of the inner and outer surfaces of lens 110, and further having a diameter of each rod 112, 114, 116, 118, 120, 122, 124 cut by primary wall 121 of lens cap 110. Thus, about one-half the width of each rod 112, 114, 116, 118, 120, 122, 124 lies on the outside of lens cap 110, and about one-half of the width of each rod 112, 114, 116, 118, 120, 122, 124 lies on the inside of lens cap 110. Further, each rod 114, 116, 118, 120, 122, has a line of intersection with each adjacent rod, that is each rod touches the adjacent rod on either side. It follows that there exists a plane that is tangent to both rods of an adjacent pair. Rods 112, 124 are adjacent only to one rod and therefore have a line of intersection with only one rod; that is, rod 112 is adjacent to rod 114 and there exists a line in common with rod 112 and 114. The same relationship is applies to rods 124, 122. Lens cap 110, which may conveniently be made of injection molded plastic, further includes integrally formed snap ring 123 comprising a generally depending circumferential lip portion for snapping over circumferential lip 45 of lens 44, as illustrated in FIG. 7.

Lens cap 110 may be any desired color. Lens cap 110 projects a wide beam of light having a rectangular cross-section. The direction of light projected through lens cap 110 can be changed by rotating lens cap 110. Any lens disclosed herein may be adapted to accommodate lens cap 110. It does not matter if water is trapped between lens cap 110 and lens 44, facilitating easy changing of lens cap 110. Lens cap 110 also protects lens 44 from impact damage and is easier and cheaper to replace than lens 44. Additionally, a lens such as that shown in FIGS. 5 and 6 may of course be integrally formed with a lens that includes an elongated screw. That is, the lens of FIGS. 5, 6 may readily be molded into any of the assemblies illustrated in FIGS. 1 through 4.

Figure 7:
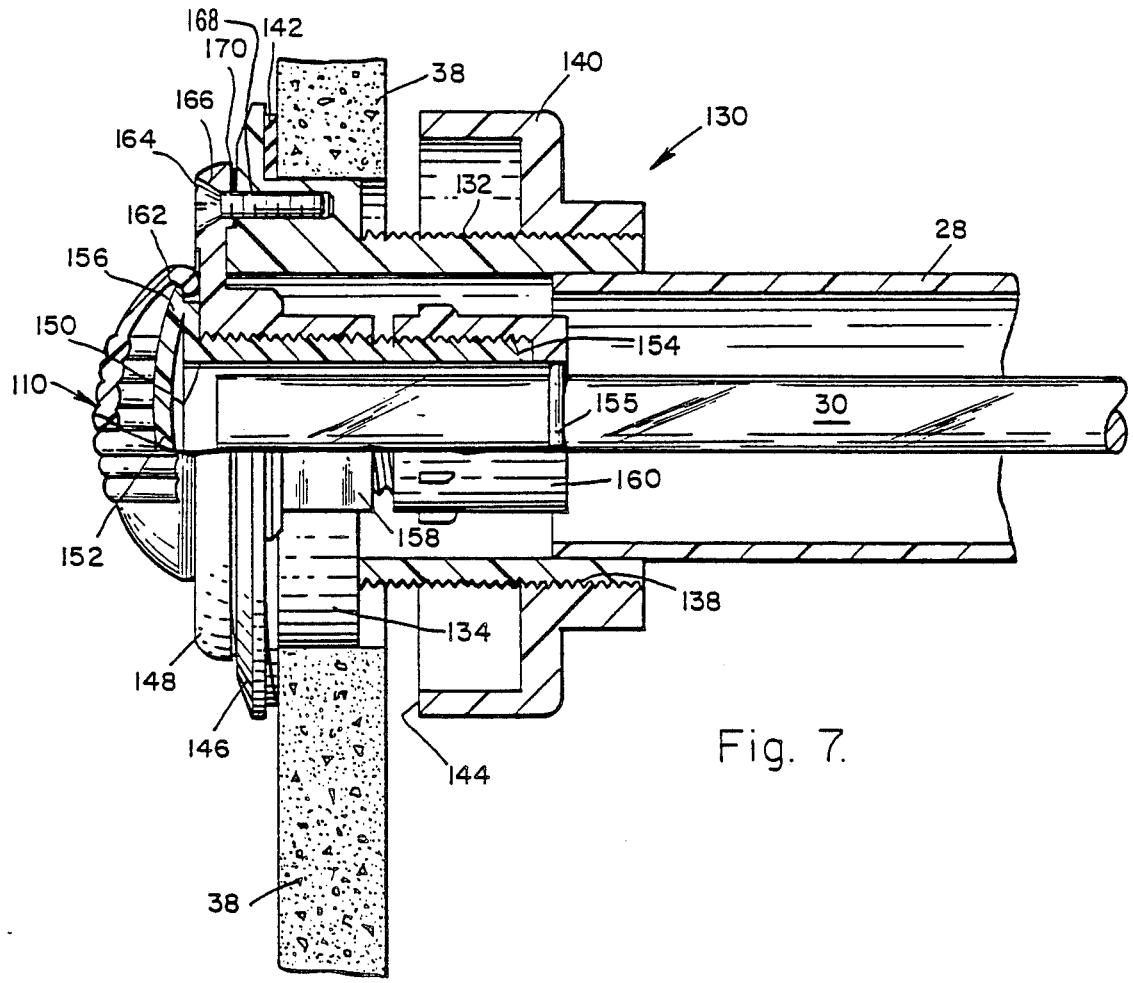
FIG. 7 is a side elevation partially in section of another embodiment of a waterproof fitting according to the present invention, having a removable lens.

Referring to FIG. 7, there is illustrated an alternative embodiment of the present invention that permits ready access to the waterproof fitting from the pool, or waterside, of the fitting. FIG. 7 illustrates waterproof fitting 130, including elongated male coupling 132, having gripping surface 134, which is solid and so provides material for engaging self-tapping screws 164, which retain face plate 148 against the face of coupling 132, as shown.

Coupling 142 also includes integrally molded threads 138 for retaining nut 140 which is screwed onto threads 138 of elongated male coupling 132. To improve the clarity of the drawing, nut 140 and elongated male coupling 132 are not screwed completely together in the drawing. In practice, nut 140 is advanced along threads 138 until edge 144 of nut 140 compresses gasket 142, which is disposed about flange 146 of elongated male coupling 132.

Face plate 148 includes central aperture 150, through which lens body 152 is inserted. Lens body 152 includes hollow screw 154 and lens 156. Nut 158 and lock nut 160 are tightened to draw lens body 152 tightly against face plate 148. Gasket 162 between the back side of lens 156 and face plate 148 provides a water tight seal. Lens 156 may conveniently be fitted with lens cap 110, as described above.

Face plate 148 is mounted on circular face 162 of elongated male coupling 132 by four screws 164, only one of which is visible in FIG. 7, inserted through countersunk apertures 166 in face plate 148 and are screwed into holes 168 drilled into the body indicated at gripping surface 134. Screws 164 may conveniently be wood screws, which are self-tapping and grip firmly in a plastic body. Gasket 170 between face plate 148 and elongated male coupling 132 provides a watertight seal.

In use, elongated male coupling 132 is inserted through an aperture in wall 38 of a pool or spa, and nut 140 is screwed up against the opposite side of wall 38. O-ring 155 provides a seal between lock nut 160 and light conduit 30, in contrast to the other embodiments, in which the light conduit does not contact an O-ring. Conduit 28 is glued to the inside of elongated male coupling 132, as illustrated.

After waterproof fitting 130 of FIG. 7 is installed, it is a simple matter to remove face plate 148, using only a screwdriver, if it is necessary or desirable to obtain access to light conduit 30 from the water-side of the fitting. Naturally, prior to removing face plate 148, it is necessary to drain the water level of the pool below the level of waterproof fitting 130.

It is important to note that light conduit 30, in its present form, consists of an outer sheathing of a material having a low index of refraction, such as Teflon tubing, with a core of light transmitting material deposited therein. Preferably, there exsists a small air gap between the light transmitting core and the outer sheath. This arrangement provides the maximum transmission of light because less light escapes the light transmitting core since air has the lowest index of refraction. It is essential that light conduit 30 itself not be exposed to water. If it is, capillary attraction will draw water into the cladding of the light conduit, destroying the air gap between the light transmitting core and the cladding, permitting the light to escape through the sidewalls of the light transmitting core, and the conduit, and dramatically reducing, if not eliminating, the amount of light transmitted through the end of light conduit 30 into the pool. Because the spaces involved are so small, as a practical matter it is impossible to drive the water out of light conduit 30, which is thereby ruined.

The present invention is not intended to be restricted to any particular form or arrangement or any specific embodiment disclosed herein, or to any specific use, since the present invention may be modified without departing from the scope or spirit of the claimed invention shown and described herein.

The invention has been described in considerable detail to comply with the patent laws by providing a full public disclosure of the best mode contempllated by the inventors for practicing their invention, Such detailed description is not, however, intended in any way to limit the broad features or principles of the invention, or the scope of the patent property to be granted.

What is claimed is:
1. A waterproof fitting comprising:
   a. a hollow screw having a transparent head;
   b. a face plate having a threaded central aperture through which said hollow screw is inserted;
   c. an elongated male coupling having a central aperture therethrough, through which said hollow screw and said face plate assembly are inserted;
   d. a nut in mating engagement with said elongated male coupling; and
   e. a plurality of fasteners securing said face plate to said elongated male coupling.

2. A waterproof fitting in accordance with claim 1 further comprising a lock nut disposed in mating engagement with said hollow screw.

3. An apparatus for providing underwater lighting, comprising:
   a. a light conduit illumination system;
   b. a waterproof fitting installed in a wall of a water-retaining structure, remote form said light conduit illumination system wherein said waterproof fitting includes a hollow screw having a transparent head, a face plate having a threaded central aperture through which said hollow screw is inserted, an elongated male coupling having a central aperture therethrough, through which said hollow screw and said face plate assembly are inserted, a nut in mating engagement with said elongated male coupling, and a plurality of fasteners securing said face plate to said elongated male coupling;
   c. a conduit having aone end connected to said waterproof fitting, and the other end connected to said light conduit illumination system; and
   d. a light conduit disposed within said conduit and having substantially the same length as said conduit.

4. A waterproof fitting comprising:
   a. a hollow screw having a transparent head which acts as a lens;
   b. a face plate having a threaded central aperture through which said hollow screw is inserted;
   c. an elongated male coupling have a gripping surface, a flange member disposed in front of the gripping surface, integrally molded threads on the exterior surface of the elongated male coupling, and a central aperture through the elongated male coupling, through which said hollow screw and said face plate assembly are inserted;
   d. a gasket disposed between the flange of said elongated male coupling and said face plate;
   e. at least one lock nut member threaded onto said hollow screw to draw the transparent head against said face plate;
   f. a nut threaded onto said integrally molded threads of said elongated male coupling to compress said gasket into sealing engagement between said face plate and said elongated male coupling; and
   g. a plurality of fasteners attaching said face plate to the gripping surface of said elongated male coupling.

5. A waterproof fitting in accordance with claim 4, further comprising a lens cap fitted over said transparent head.

6. An apparatus for providing underwater lighting, comprising:
   a. a light conduit illumination system;
   b. a waterproof fitting installed in a wall of a water-retaining structure, remote from said light conduit illumination system wherein said waterproof fitting includes a hollow screw having a transparent head which acts as a lens, a face plate having a threaded central aperture through which said hollow screw is inserted, an elongated male coupling have a gripping surface, a flange member disposed in front of the gripping surface, integrally molded threads on the exterior surface of the elongated male coupling, and a central aperture through the elongated male coupling, through which said hollow screw and said face plate assembly are inserted, a gasket disposed between the flange of said elongated male coupling and said face plate, at least one lock nut threaded onto said hollow screw to draw the transparent head against said face plate, a nut threaded onto said integrally molded threads of said elongated male coupling to compress said gasket into sealing engagement between said face plate and said elongated male coupling, and a plurality of fasteners attaching said face plate to the gripping surface of said elongated male coupling;

c. a conduit having one end connected to said waterproof fitting, and the other end connected to said light conduit illumination system; and d. a light conduit disposed within said conduit and having substantially the same length as said conduit.

7. An apparatus in accordance with claim 6, further comprising a lens cap fitted over said transparent head.

8. An apparatus in accordance with claim 6 further comprising an O-ring in sealing engagement between said a least one lock nut and said light conduit.

9. An apparatus in accordance with claim 6 wherein said conduit is glued to the inside of said elongated male coupling.

* * * * *